Aug. 8, 1933.                E. H. LORENZ                1,921,393
RECEIVER FOR GLASS FORMING MACHINES
Filed July 11, 1930
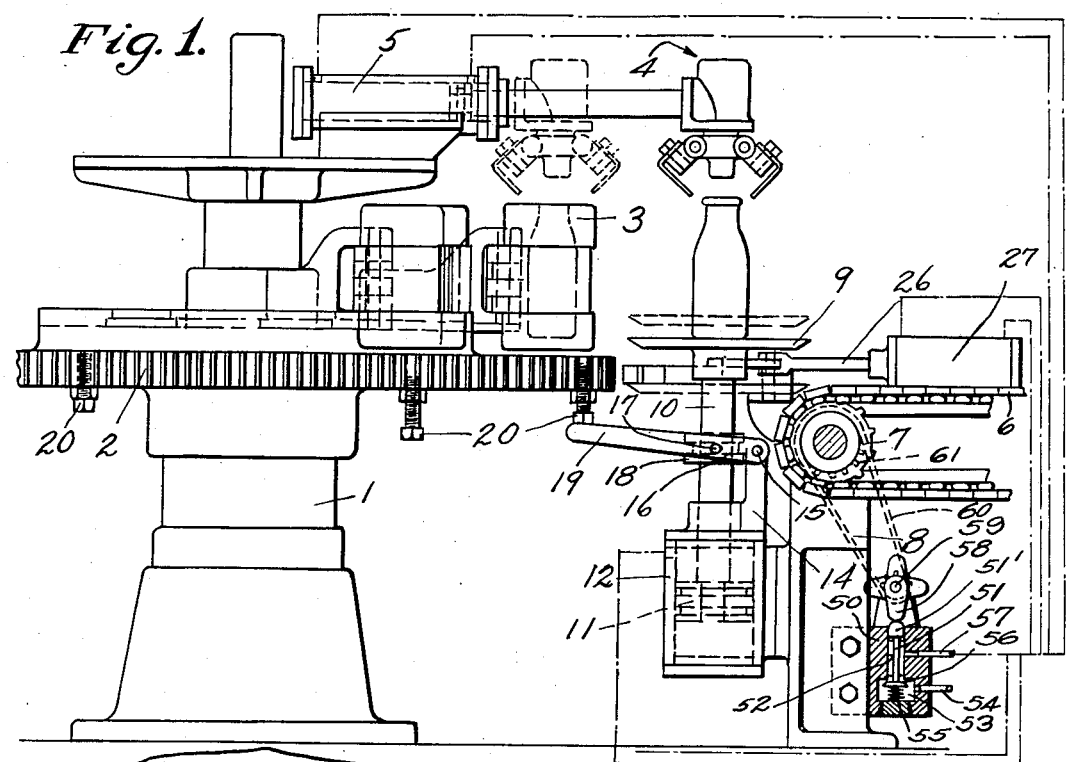
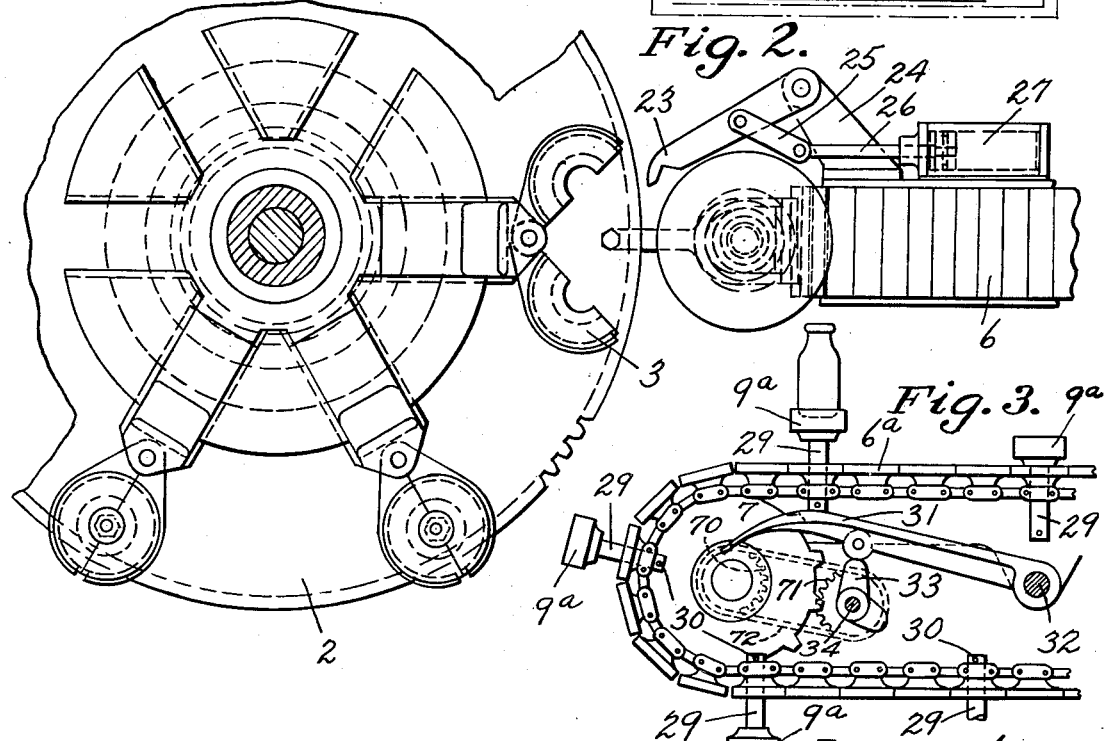
Witness:
Inventor;
Edward H. Lorenz
by Berry Parham
Attorneys.

Patented Aug. 8, 1933

1,921,393

UNITED STATES PATENT OFFICE 1,921,393

RECEIVER FOR GLASS FORMING MACHINES

Edward H. Lorenz, West Hartford, Conn., assignor to Hartford-Empire Company, Hartford, Conn., a Corporation of Delaware Application July 11, 1930. Serial No. 467,197

15 Claims. (Cl. 49—14)

My invention relates to apparatus for use in connection with the manufacture of glassware, and particularly with that portion of the manufacture of glassware relating to the automatic handling of formed glass articles to transfer them from the machine by which such articles are formed to some subsequently used apparatus such as an annealing lehr.

It often happens, particularly in the manufacture of glass articles, such as bottles, that a machine used for forming such articles has a larger capacity than is desired to fill a particular order, and as a result the machine may be used so as to produce articles of various sizes respectively in the several molds thereof, and thus several orders may be filled simultaneously. Certain difficulties have arisen under these or similar circumstances incident to the handling of articles such as bottles of different heights.

It is usual in present commercial operation to remove articles from the molds in which they are given their final shape by automatically operated mechanical means, specifically by some take-out tongs, which grasp the upper portions of the articles, as the necks of bottles, and move them to a receiving station. Transfer tongs of this character are usually adapted to grip portions of articles, such as the necks of bottles, at a predetermined level and to release the articles with their upper portions or necks at another position and at the same level as that of the pick-up point. In the case of articles having different heights, the bottoms of articles thus deposited or released from the takeout tongs will be at varying levels, so that if the receiver is positioned at an unchanging level to receive the tallest articles, the shorter ones will be released from the takeout tongs at a position so far above the receiver that the articles may topple over and/or be damaged by the fall.

An object of my invention is, therefore, to provide a suitable receiver which may be automatically and preferably also adjustably positioned at a level designed to compensate respectively for the variation in heights of the articles being received thereby, and which is adapted to be moved thereafter in such a way that the articles may be further handled with ease.

Other objects and advantages of my present invention will be apparent from a reading of the following specification and subjoined claims when taken in connection with the accompanying drawing, in which:

Figure 1 is an elevation, with certain parts omitted for the sake of clearness, of a portion of a forming machine, take-out and conveyer in combination with an embodiment of my present invention;

Fig. 2 is a plan view of the same; and

Fig. 3 is a side elevation of another embodiment of my invention wherein the receiver is combined with a conveyer by which the articles are removed.

Referring first to Figs. 1 and 2 of the drawing, 1 represents the pedestal of the forming machine, 2 the rotary mold table, and 3 one of the partible molds, the same being shown open in Fig. 2.

I have more or less diagrammatically illustrated a conventional form of takeout at 4 including a tongs mechanism of well known type associated with the mold table 2 of a forming machine. The takeout 4 is adapted to remove articles successively from the molds 3 of the machine and position such articles on a receiver hereafter to be described. The tongs mechanism 4 is adapted to be moved by means of a pneumatic cylinder 5 from a position shown in dotted lines in Fig. 1 in vertical alignment with the mold 3 at the takeout station to the position shown in full lines in said figure in vertical alignment with the receiving station. Means are also provided for opening and closing the tongs at the proper times and for moving the tongs vertically, so that upon opening the mold, the article gripped in the tongs is first moved vertically, then outwardly from the machine to a position in alignment with the receiving station, then lowered vertically to the lowermost position of the tongs, at which position the receiving platform 9 is adapted to be substantially in contact with the bottom of the article in a manner hereinafter to be more specifically described. The tongs are then opened and raised in open position, releasing the article, and are thereafter returned by lateral and subsequent vertical downward movements to their initial position to grip the next succeeding article. The entire operation of the tongs is suitably synchronized with other operations of the machine. Inasmuch as the details of the tong mechanism form no part of the present invention, no further description thereof will be given.

6 represents the conveyor upon which the articles made in the machine shown are to be deposited for transference to the lehr by which they are to be annealed. The conveyer is suitably driven and passes around a sprocket 7 which rotates clockwise in Fig. 1. The front end of the conveyer, which is shown, is supported by the pedestal 8.

9 represents a platform in the form of a horizontally disposed disk mounted on the upper end of a piston rod 10, which in turn is connected to the piston 11 working in a vertically disposed fluid pressure cylinder 12 mounted on the pedestal 8. The ends of the cylinder 12 are connected as by the pipes to a supply of fluid pressure, which supply is also provided with suitable valves and timing mechanism all well known in the art whereby fluid pressure may be admitted to the ends of the cylinder 12 at the proper times to raise and lower the platform 9.

I have illustrated diagrammatically in Fig. 1 a workable system for the distribution of pneumatic pressure which might be used in combination with my apparatus, such system including a bank of valves 50, one of which is shown in vertical transverse section. These valves each comprise a movable valve member 51 having webs thereon contacting with the sides of the cylindrical bore 52 and intervening grooves through which pressure may pass and in which bore the valve member 51 is mounted for vertical sliding movement. The bore 52 communicates at its lower end with a chamber 53 common to the bank of valves with which chamber communicates a pipe 54 leading from some suitable source of fluid pressure. A compression spring 55 is positioned below each of the valve members 51 and as shown abuts against the poppet valve portion 56 at the lower end of each valve stem, this poppet valve controlling communication between the chamber 53 and the bore 52 so that pressure may pass through the grooves of members 51. The bore communicates through a pipe 57 with one end of one of the fluid pressure actuating cylinders shown for the machine, that is cylinders 5, 12 or 27 as indicated diagrammatically by the dot and dash lines, one valve such as that shown being used for each end of each of the cylinders 5, 12 and 27. When the valve member 51 is in its uppermost position, exhaust from the pipe 57 is permitted at the upper end of the bore 52, the plug portion 51' of the valve member 51 being at this time above the top of the bore 52.

The valves are actuated at the proper times by suitable cams such as 58, suitably shaped and positioned upon a continuously rotated cam shaft 59, one cam being employed for each valve and the shaft being driven by some suitable means as the sprocket chain 60 from a suitable continuously rotating sprocket as 61 mounted on the axis of the sprocket 7. Thus the valves will all be actuated in proper timed relation one with the other and in proper timed relation with the movement of the conveyer, so that the apparatus will operate in the manner hereinafter more specifically to be described.

14 represents a standard rising vertically from the cylinder 12, to the upper end of which the ends of a yoke 16 are pivoted as indicated at 15, the yoke straddling the piston rod 10 and being provided with inwardly extending pins 17, which engage a circumferentially grooved collar 18 fixed on the piston rod 10. The yoke 16 is provided with an arm 19 which extends beneath the edge of the rotary table 2.

The under side of the table 2 is provided with a plurality of adjustable limiting stops 20, which are successively engaged from below by the free end of the arm 19 and which thus adjustably limit the upward movement of the piston 11. One of said stops is positioned in such relation with each of the molds 3 mounted on the table 2 that when the mold comes to rest in the takeout position, the stop is positioned directly above the arm 19, so that as the piston 11 rises in the cylinder 12 and the platform 9 is raised, the arm 19 will come into engagement with said stop and thus halt the upward movement of the platform. By adjusting the length of the stop projecting beneath the table 2, the platform 9 may be halted in the proper position to receive the bottle from the takeout without necessitating the dropping of the bottle. These stops may be in the form of headed bolts which may be screwed into threaded holes in the under side of the table and clamped in adjusted position by suitable jam nuts, the effective lengths of the stops being regulated by the degree in which they are screwed into their holes.

Where the table is continuously rotated instead of intermittently rotated as above indicated, the stops may be provided with prolonged contact surfaces so that the period of their engagement with the arm 19 will be of sufficient duration to hold the platform 9 at the proper elevation until the takeout operation is completed.

The platform is elevated for each takeout operation to the proper level to receive the bottle from the corresponding mold, and is then lowered to substantially the same level as that of the top flight of the conveyer 6.

To transfer the bottle from the lowered platform, I provide a sweeper arm 23 arranged at the proper level to be moved over the platform 9 when the same is in its lowermost position. The sweeper arm may be pivoted on a vertical axis at one end to a bracket 24 extending upwardly from the pedestal 8. The sweeper arm 23 is connected as by a link 25 to the piston rod 26 of a fluid pressure cylinder and piston mechanism 27, which may also be supported from the pedestal 8. Fluid pressure is admitted to the ends of the cylinder as by pipes first to move the sweeper 23 across the platform 9 to transfer the bottle which has been deposited on the platform by the takeout 4 to the conveyer, and then to retract the sweeper out of the way to permit the raising of the platform 9 to receive the succeeding article.

Referring now to Fig. 3, I show the conveyer 6a provided with a plurality of platforms 9a, mounted on stems 29 which are slidably mounted in the conveyer so that they may be elevated above the top flight of the same to the proper elevation to receive a bottle directly from the takeout 4, the conveyer of Fig. 3 being arranged so that it moves beneath the discharge position of the take-out. The stems 29 are provided with pins 30 to prevent their dropping from the lower flight of the conveyer.

The platforms 9a are in turn raised to the desired receiving level at the receiving position by convenient means, such as the swing lever 31, pivoted on a horizontal axis as at 32 to a portion of the conveyer frame, and alternately raised and lowered by means of the multiple lobe cam member 33 mounted on the shaft 34, which may be constantly driven from the driving means of the conveyer and synchronized with the operation of the mold table and the conveyer. Such means may comprise a sprocket 70 mounted upon and rigid with the axis of the sprocket 7 and a sprocket 71 mounted upon and rigid with the shaft 34, these sprockets being suitably connected by a sprocket chain 72. The lobes of the cam member 33 are of different lengths, so that they will raise the lever 31 to different heights, the lever being so disposed that it will elevate the platforms 9a as they pass their receiving position. The front or entrance end of the lever is curved downwardly so that the platform stems 29 will ride up on the same gradually and without jarring. As the stems pass off of the lever the platforms 9a are lowered by gravity in relation to the conveyer as shown at the right in Fig. 3.

By providing a cam with lobes of proper length, the platforms as they pass through the receiving position are raised to the proper level to receive the bottles from the take-out without dropping and are then lowered as they pass towards the lehr. Obviously suitable interchangeable cams may be used to take care of other mold combinations.

In the case of the embodiment illustrated in Fig. 3, the molds on the table are arranged to correspond with the lobes of the cam member so that a lobe of suitable effective length will engage the lever and elevate a platform 9a to the proper height to receive without dropping the bottle taken from the mold.

My device is simple and inexpensive. It enables bottles of various heights to be properly removed from the forming machine and to be properly delivered to the conveyer or other support.

While I have shown and described but two embodiments of my invention, it is obvious that the principles thereof may be used in other ways, and I do not wish to be limited therefore except by the scope of the appended claims, which are to be construed as broadly as the state of the prior art permits.

What I claim is:—

1. The combination with a glass forming machine arranged for fabricating articles of different heights and a take-out for the removal of the articles from the machine, of a receiver upon which the take-out deposits the articles removed from the machine, automatic means for raising and lowering the receiver into and out of its receiving position, and selective means for varying the elevation of the receiver in its receiving position in accordance with the heights of the articles being transferred, whereby to enable the take-out to deposit the articles thereon without dropping.

2. The combination with a glass forming machine arranged for fabricating articles of different heights and a take-out for the removal of the articles from the machine, of a receiver upon which the take-out deposits the articles removed from the machine, and selective means operated automatically and in synchronization with the take-out operations for presenting the receiver at different elevations selected in accordance with the heights of the articles being transferred to compensate respectively for articles of different heights, whereby to enable the take-out to deposit the articles thereon without dropping.

3. The combination with a glass forming machine arranged for fabricating articles of different heights and a take-out for the removal of the articles from the machine, of a receiver upon which the take-out deposits the articles removed from the machine, automatic means for raising and lowering the receiver in synchronization with the take-out operations, and means for selectively limiting the upward movements of the receiver to compensate respectively for the heights of articles to be received, whereby to enable the take-out to deposit the articles on the receiver without dropping.

4. The combination with a glass forming machine arranged for fabricating articles of different heights and a take-out for the removal of the articles from the machine and a support to which the articles are to be delivered from the take-out, of a receiver operatively interposed between the take-out and the support and comprising a platform arranged to be moved between the deposit position of the take-out and the support, automatic means for raising and lowering said platform in synchronism with the take-out operations, and means for selectively limiting the movement of the platform vertically toward the deposit position to compensate respectively for the heights of articles to be received, whereby to enable the take-out to deposit the articles on the support without dropping.

5. The combination with a glass forming machine arranged for the fabrication of articles of different heights and a take-out for the removal of the articles from the machine and a support to which the articles are to be delivered from the take-out, said take-out and said support being on different levels, of a receiver comprising a platform arranged for vertical movements between the take-out and the support, automatic means for moving said platform vertically in synchronism with the take-out operations, and means for selectively limiting the vertical movement of the platform toward the take-out to compensate respectively for the heights of articles to be received, whereby to enable the take-out to deposit the articles on the platform without dropping.

6. The combination with a glass forming machine arranged for the fabrication of articles of different heights and a take-out for the removal of the articles from the machine and a support to which the articles are to be delivered from the take-out, said take-out and said support being on different levels, of a receiver comprising a platform arranged for vertical movements between the take-out and the support, automatic means for moving said platform vertically in synchronism with the take-out operations, and means, operated in synchronization with the operations of the take-out, for selectively limiting the movements of the platform toward the take-out to compensate respectively for the heights of articles to be received, whereby to enable the take-out to deposit the articles on the platform without dropping.

7. The combination with a glass forming machine which is provided with a movable mold support and molds suitable for the fabrication of articles of different heights arranged on said mold support and brought in turn to the take-out position by the movement of the mold support and a take-out arranged for the removal of the articles from the molds, of a receiver upon which the take-out deposits the articles, automatic means for raising and lowering said receiver into and out of receiving relation with the take-out, and means associated with each of the molds for limiting the movement of the receiver into receiving relation with the take-out to compensate respectively for the heights of articles to be received, whereby the take-out is enabled to deposit the articles on the receiver without dropping.

8. The combination with a glass forming machine which is provided with a movable mold support and molds suitable for the fabrication of articles of different heights arranged on said mold support and brought in turn to the take-out position by the movement of the mold support and a take-out arranged for the removal of the articles from the molds, of a receiver upon which the take-out deposits the articles, automatic means for raising and lowering said receiver into and out of receiving relation with the take-out, and means associated with each of the molds for limiting the movement of the receiver into receiving relation with the take-out, whereby the take-out is enabled to deposit the articles on the receiver without dropping, said limiting means being adjustable to properly position the receiver to receive the article fabricated in the corresponding mold.

9. The combination with a glass forming machine which is provided with a movable mold support and molds suitable for the fabrication of articles of different heights arranged on said mold support and brought in turn to the take-out position by the movement of the mold support and a take-out arranged for the removal of the articles from the molds, of a receiver upon which the take-out deposits the articles, automatic means for raising and lowering said receiver into and out of receiving relation with the take-out, and means, comprising stops carried by the mold support and respectively associated with the several molds, arranged to limit the movement of the receiver into receiving relation with the take-out, whereby to enable the take-out to deposit the articles from the corresponding molds on the receiver without dropping.

10. The combination with a glass forming machine which is provided with a movable mold support and molds suitable for the fabrication of articles of different heights arranged on said mold support and brought in turn to the take-out position by the movement of the mold support and a take-out arranged for the removal of the articles from the molds, of a receiver upon which the take-out deposits the articles, automatic means for raising and lowering said receiver into and out of receiving relation with the take-out, and means, comprising stops carried by the mold support and individually associated with the several molds, arranged to limit the movement of the receiver into receiving relation with the take-out, whereby to enable the take-out to deposit the articles from the corresponding molds on the receiver without dropping, said stops being adjustable, whereby to properly position the receiver to receive the article fabricated in the corresponding mold.

11. The combination with a glass forming machine arranged for fabricating articles of different heights and a take-out for removing the articles from the machine, of a travelling conveyer, a plurality of receivers mounted on said conveyer and movable relative thereto, and automatic means for individually moving said receivers into respectively different receiving relationships with the take-out whereby to compensate for variations in the heights of the articles being handled and whereby the take-out is enabled to deposit the articles on the receivers without dropping.

12. The combination with a glass forming machine arranged for fabricating articles of different heights and a take-out for removing the articles from the machine, of a travelling conveyer, a plurality of receivers mounted on the conveyer and movable relative thereto, and selective automatic means for moving the individual receivers into predetermined different elevations relative to the take-out, as said receivers in turn reach the receiving position whereby to compensate for variations in the heights of the articles being handled and whereby to enable the take-out to deposit the articles on the receiver without dropping.

13. The combination with a glass forming machine arranged for fabricating articles of different heights and a take-out for removing the articles from the machine, of a travelling conveyer, a plurality of receivers mounted on the conveyer and movable relative thereto, automatic means for moving the receivers relative to the conveyer as the receivers reach the receiving position, said means being selective whereby to compensate for variations in the heights of the articles being handled and whereby to properly present the receivers and enable the take-out to deposit the articles on the receivers without dropping.

14. The combination with an automatically operated glass forming machine arranged for fabricating a plurality of articles of different heights in each of its recurring cycles of operation, and an automatically actuated take-out mechanism for the removal of the articles from the machine, of a receiver upon which the take-out mechanism deposits the articles removed from the machine, and automatic means for successively and in recurring cycles varying the elevation of the receiver to heights predetermined respectively in accordance with the heights of the articles being transferred, whereby to enable the take-out mechanism to deposit the articles thereon without dropping them.

15. The combination with an automatically operated glass forming machine arranged for fabricating a plurality of articles of different heights in each of its recurring cycles of operation, and an automatically actuated take-out mechanism for the removal of the articles from the machine, of a receiver upon which the take-out deposits the articles as they are successively removed from the machine, and selective means operating automatically and in synchronism with the operation of the take-out mechanism for presenting the receiver at a recurring series of different elevations selected respectively in accordance with the heights of the articles being transferred to compensate respectively for the articles of different heights formed in each cycle of the operation of the machine, whereby to enable the take-out to deposit the articles thereon without dropping.

EDWARD H. LORENZ.